United States Patent Office 3,030,305
Patented Apr. 17, 1962

3,030,305
LUBRICANT COATING COMPOSITIONS
Robert E. Murray, Needham, Mass., assignor to B. B. Chemical Co., Boston, Mass., a corporation of Massachusetts
No Drawing. Filed Oct. 6, 1959, Ser. No. 844,650
7 Claims. (Cl. 252—49.7)

This invention relates to a lubricating coating material and particularly to a last slip for the removal of shoes from lasts.

Shoes are shaped by pulling the upper portions tightly around lasts. The close engagement between a shoe upper and the last on which it was shaped makes it difficult to remove the shoe from the last. To reduce this difficulty it is common to apply a waxy coating to the last. These waxy coatings are known as "last slips" and are usually aqueous emulsions of waxes.

While known waxy coatings reduce the last removal difficulty, there are numerous situations in which they fall short of desired effectiveness. Hot humid weather markedly reduces the slipperiness of the usual wax coatings. Also previous last slips required fairly high solids content to form a useful coating and further coatings when a last was reused resulted in build up of the material on the last. This build up might in time affect the size of the last. But more important, the build up coating tended to flake off and dirty the shoes.

It is a feature of the present invention to provide a new anti-stick coating or last slip which will give superior slip properties and which is substantially unaffected by temperature and humidity conditions encountered. It is a further feature to provide a last slip which minimizes building up and flaking off problems in the recoating of lasts for reuse.

The last slip of the present invention is a combination in volatile organic solvent of a silicone rubber gum, a normally solid, relatively high melting paste-forming wax incompatible with the silicone gum and an organophilic bentonite clay swelled by a volatile organic liquid to provide desired bodying of the last slip composition for effective application and superior slip promoting character after application of the last slip and evaporation of the volatile organic solvent and swelling liquid.

An important factor contributing to the effectiveness of the present last slip is the combination of normally solid incompatible materials which cooperate in a novel way to provide an adhesion-resistant slippery surface. The solid nature of the components insures that the effects of temperature are minimized and the slip promoting ability of the coating from such compositions is largely unaffected by the temperature and humidity conditions. Additionally, the present combination offers continuing resistance to penetration of adhesives or liquids which may be involved in shoemaking. Finally, the somewhat resilient character of the silicone rubber gum component provides unusual characteristics to the last slip on the last so that even under severe conditions it retains its effectiveness to promote removal of a shoe from a last.

The solid components of the last slip, i.e. the relatively high melting paste-forming wax and the silicone rubber gum, are brought into intimate relation with each other in which they can cooperate to provide this new action by solution in a volatile organic solvent for the wax and silicone rubber gum. The admixture is effected at elevated temperatures so that the wax is dissolved in the solvent for the silicone rubber gum and the mixture thereafter cooled. The term "paste-forming wax" refers to a wax of a class recognized in the wax polish field, which after solution by heating with solvent reforms in relatively soft fine particulate form as distinguished from hard granular form. The soft particulate form is apparently due to retained solvent acting as a softener and plasticizer for the particles.

The cooling of the solution of silicone rubber gum and paste-forming wax precipitates a portion of the wax in the form of fine particles uniformly distributed through the remainder of the mixture; and the wax particles are to some extent softened and plasticized by the solvent component.

A further important characteristic which is important to the present last slip is the viscosity and body for application of an effective film of the material to a last. That is, the composition must be capable of being applied smoothly and uniformly to the last; and the applied material must have sufficient body so that it does not run off but remains in place in a coating of sufficient thickness that after drying the resultant film is capable of performing its function. It has been found that compositions containing the desired proportion of solvent are ordinarily too thin, but that organophilic clays such as those formed by replacing exchangeable inorganic cations of the montmorillonites including sodium, lithium, potassium and other bentonites with organic cations from salts of aliphatic, cyclic, aromatic and hetercyclic amines, primary, secondary and tertiary amines and quaternary ammonium compounds which are swelled by the solvent component, impart the desired consistency to enable effective application of the composition to a last. Procedure for the preparation of these compounds is given in the U.S. Patent to E. A. Hauser, No. 2,531,427. A preferred organophilic clay is dimethyl, dioctadecyl ammonium bentonite. There is some indication also that the organophilic clay has a further cooperation with the wax and silicone gum to secure and maintain the special cooperative relationship. It is found that the effectiveness of the organophilic bentonite clay in promoting cooperative action is further improved by including in the composition a volatile organic liquid which has a swelling action on the clay material. Suitable additive liquids are the one and two carbon alcohols, i.e. methyl alcohol and ethyl alcohol, ethyl acetate, acetone, methyl ethyl ketone, isoamyl acetate, ethylene dichloride, cyclohexanone and others.

The last slip may be formed by dissolving the silicone rubber gum in volatile organic solvent solution. Silicone rubber gum is a normally solid, resilient material having an extremely tacky surface. Chemically, it is an uncured but curable high molecular weight polymer of dimethyl siloxane. Conventional use of this gum involves processing on standard rubber equipment to mix it with fillers and curing agents, usually peroxidic curing agents, molding the mixture and curing it by heat to solid, resilient condition. Silicone gums useful in the present composition are available commercially. Solution of the silicone gum in the solvent involves simple mixing in a churn. A solution containing from about 15% to about 20% by weight of silicone gum is usually prepared.

The next step in preparation of the last slip is dissolving the wax in solvent. This is ordinarily done by heating the silicone gum solution to a temperature of from about 70° C. to about 110° C. and adding the wax, which is a normally solid, paste-forming wax having a melting point of at least about 60° C. and selected to be incompatible with the silicone gum, to the silicone gum solution. From about one to about eight parts by weight of the wax based for each part by weight of the silicone gum are incorporated and dissolved at the temperature of the solution to form a clear liquid. Suitable waxes which are commercially available include ozokenite, beeswax, microcrystalline petroleum type waxes, for example a commercial hydrocarbon wax melting at 215° to 218° F., soluble at temperatures above 165° F. in aromatic hydrocarbons, mineral spirits and chlorinated solvents which precipitates from such solvents on cooling to form a paste, and various esters of montan wax such as the ethylene glycol or butylene glycol esters and mixed ethylene and butylene glycol esters of oxidized montan wax. These waxes are interchangeable on a weight for weight basis.

When the wax is dissolved, there is added to the solution of silicone gum and wax in heated condition from one-half to two parts by weight of organophilic bentonite clay for each part of wax and from one-half to two pints per gallon of the solution of a volatile organic liquid swelling agent, such as ethyl alcohol, which cooperates with the organophilic bentonite clay to increase its swelling action. The container in which the components are mixed is then closed and maintained in heated condition suitably from about 70° to about 110° C. while being tumbled to effect intimate admixture of all of the components. The mixture is then cooled and is found to be a thick, creamy liquid. Further solvent may be added to adjust the consistency to a value suitable for simple brush application to a last.

To deposit on a last a coating effective to promote removal of shoes the composition should contain from 5% to 15% by weight solids, and at least ½% and preferably from ½% to 6% of silicone rubber gum, the percentages being based on the weight of the last slip composition.

The following example is given as an aid in understanding the invention, but the invention is not restricted to the particular materials, proportions, or method of compounding set forth in the example:

*Example*

9 gal. of a petroleum naphtha solvent of specific gravity 0.7632 and distillation range of 242° to 318° F. were placed in a churn and 12½ lbs. of silicone rubber gum were added. The silicone rubber gum was a dimethyl siloxane polymer having a specific gravity of 0.98 and a Williams plasticity number of 89 to 114 as determined by ASTM method D926 at room temperature for 3 minutes. The churn was operated until the silicone rubber gum dissolved to form a clear solution. The resulting solution which had a volume of about 10 gal. was transferred to a glass lined, steam jacketed, closed kettle fitted with an agitator and a reflux condenser. There was also introduced into the kettle 40 gal. of the same petroleum naphtha solvent, 25 lbs. of dimethyl dicetyl ammonium bentonite and 25 lbs. of beeswax.

The kettle was closed and the agitator in the kettle set in operation. Steam was introduced into the jacket to raise and maintain the temperature at 100° C. After 30 minutes of agitation with heating the wax was found to have dissolved completely in the material in the kettle. The temperature was then reduced to 75° C. and there were added 12½ gal. of denatured alcohol and 31½ gal. of a petroleum naphtha solvent having a distillation range of 200° to 271° F. The mixture was agitated for 15 minutes while maintaining the temperature above 65° C. The mixture was then cooled to room temperature and was a nontransparent liquid having the consistency of heavy cream. The solids content was 9.1% by weight and the silicone rubber gum content was 2% based on the total weight of the mixture.

The product was brushed on the surface of a last and the last used for the manufacture of a shoe. After the shoe was complete it was found that the shoe was readily removable from the last with no sticking.

Having thus described my invention, what I claim as new and desire to secure by Letters Patent of the United States is:

1. A lubricating coating composition consisting essentially of a volatile organic solvent, one part by weight of polydimethyl siloxane rubber gum dissolved in said solvent, from about one to about 8 parts of a paste-forming wax incompatible with said gum dispersed in said volatile organic solvent, said polydimethyl siloxane rubber gum having a specific gravity of 0.98 and a Williams plasticity number of from 89 to 114 and said solvent being selected from the group consisting of volatile liquid aromatic hydrocarbons, mineral spirits and chlorinated hydrocarbon solvents for said gum and said wax, an organophilic bentonite clay formed by the reaction of bentonite with an alkyl ammonium cation, and an organic liquid swelling agent for said clay, the wax being in the form of finely dispersed solvent plasticized particles and the organophilic bentonite clay being swelled by the swelling agent to a colloidal condition thickening and giving body to the composition to enable application of a film of effective thickness.

2. A lubricating coating composition consisting essentially of a volatile organic solvent, one part by weight of polydimethyl siloxane gum dissolved in said solvent, from about one to about eight parts by weight of a paste-forming wax have a melting point of at least 60° C. incompatible with said gum dispersed in said volatile organic solvent, said polydimethyl siloxane rubber gum having a specific gravity of 0.98 and a Williams plasticity number of from 89 to 114 and said solvent being selected from the group consisting of volatile liquid aromatic hydrocarbons, mineral spirits and chlorinated hydrocarbon solvents for said gum and said wax, from about 50% to about 200% by weight based on the weight of the wax of an organophilic bentonite clay formed by the reaction of bentonite with an alkyl ammonium cation, and an organic liquid swelling agent for said clay, said swelling agent being selected from the group consisting of methyl alcohol, ethyl alcohol, ethyl acetate, acetone, methyl ethyl ketone, isoamyl acetate, ethylene dichloride and cyclohexanone, the wax being in the form of finely dispersed solvent plasticized particles and the organophilic bentonite clay being swelled by the swelling agent to a colloidal condition thickening and giving body to the composition to enable application of a film of effective thickness.

3. A last slip adapted to form when applied to a last and dried, a coating adherent to the last and offering very low resistance to sliding of shoe interiors thereover in removal of shoes from lasts, said last slip consisting essentially of a volatile organic solvent, one part by weight of polydimethyl siloxane rubber gum dissolved in said solvent, from about one to about eight parts by weight of a paste-forming wax having a melting point of at least 60° C. incompatible with said gum dispersed in said volatile organic solvent, said polydimethyl siloxane rubber gum having a specific gravity of 0.98 and a Williams plasticity number of from 89 to 114 and said solvent being selected from the group consisting of volatile liquid aromatic hydrocarbons, mineral spirits and chlorinated hydrocarbon solvents for said gum and said wax, from about 50% to about 200% by weight based on the weight of the wax of an organophilic bentonite clay formed by the reaction of bentonite with an alkyl ammonium cation, and an organic liquid swelling agent for said clay, said swelling agent being selected from the group consisting of methyl alcohol, ethyl alcohol, ethyl acetate, acetone, methyl ethyl ketone, isoamyl acetate, ethylene dichloride and cyclohexanone, the wax being in the form of finely dispersed solvent plasticized particles and the organophilic bentonite clay being swelled by the swelling agent to a colloidal condition thickening and giving body to the composition to enable application to a last of a film of effective thickness, said last slip having a solids content of from about 5% to about 15% and a polydimethyl siloxane rubber gum content of at least ½% and containing from about ½ to about 2 pints per gallon of said swelling agent.

4. A last slip adapted to form when applied to a last and dried a coating adherent to the last and offering very low resistance to sliding of shoe interiors thereover in removal of shoes from lasts, said last slip consisting essentially of a volatile organic solvent, one part by weight of polydimethyl siloxane rubber gum dissolved in said solvent, from about one to about eight parts by weight of a paste-forming wax incompatible with said gum dispersed in said volatile organic solvent, said polydimethyl siloxane rubber gum having a specific gravity of 0.98 and a Williams plasticity number of from 89 to 114 and said solvent being selected from the group consisting of volatile liquid aromatic hydrocarbons, mineral spirits and chlorinated hydrocarbon solvents for said gum and said wax, from about 50% to about 200% by weight based on the weight of the wax of dimethyl dicetyl ammonium bentonite, and an alcohol having from one to two carbon atoms, the wax being in the form of finely dispersed solvent plasticized particles and the dimethyl dicetyl ammonium bentonite being swelled by the alcohol to a colloidal condition thickening and giving body to the composition to enable application to a last of a film of effective thickness, said last slip having a solids content of from about 5% to about 15%, and a polydimethyl siloxane rubber gum content of from about ½% to about 6% and containing from about one-half to about two pints per gallon of said alcohol.

5. A last slip adapted to form when applied to a last and dried a coating adherent to the last and offering very low resistance to sliding of shoe interiors thereover in removal of shoes from lasts, said last slip consisting essentially of a volatile organic solvent, one part by weight of polydimethyl siloxane rubber gum dissolved in said solvent, from about one to about eight parts by weight of beeswax, said polydimethyl siloxane rubber gum having a specific gravity of 0.98 and a Williams plasticity number of from 89 to 114 and said solvent being selected from the group consisting of volatile liquid aromatic hydrocarbons, mineral spirits and chlorinated hydrocarbon solvents for said gum and said beeswax, from about 50% to about 200% by weight based on the weight of the wax of dimethyl dicetyl ammonium bentonite, and an alcohol having from one to two carbon atoms, the beeswax being in the form of finely dispersed solvent plasticized particles and the dimethyl dicetyl ammonium bentonite being swelled by the alcohol to a colloidal condition thickening and giving body to the composition to enable application to a last of a film of effective thickness, said last slip having a solids content of from about 5% to about 15%, and a polydimethyl siloxane rubber gum content of from about ½% to about 6% and containing from about one-half to about two pints per gallon of said alcohol.

6. A last slip adapted to form when applied to a last and dried a coating adherent to the last and offering very low resistance to sliding of shoe interiors thereover in removal of shoes from lasts, said last slip consisting essentially of a volatile organic solvent, one part by weight of polydimethyl siloxane rubber gum dissolved in said solvent, from about one to about eight parts by weight of a paste-forming hydrocarbon wax having a melting point of 215° to 218° F., being soluble at temperatures above 165° F. in aromatic hydrocarbons, mineral spirits and chlorinated solvents and being incompatible with said gum, said polydimethyl siloxane rubber gum having a specific gravity of 0.98 and a Williams plasticity number of from 89 to 114 and said solvent being selected from the group consisting of volatile liquid aromatic hydrocarbons, mineral spirits and chlorinated hydrocarbon solvents for said gum and said wax, dispersed in said volatile organic solvent, from about 50% to about 200% by weight based on the weight of the wax of dimethyl dicetyl ammonium bentonite, and an alcohol having from one to two carbon atoms, the wax being in the form of finely dispersed solvent plasticized particles and the dimethyl dicetyl ammonium bentonite being swelled by the alcohol to a colloidal condition thickening and giving body to the composition to enable application to a last of a film of effective thickness, said last slip having a solids content of from about 5% to about 15%, and a polydimethyl siloxane rubber gum content of from about ½% to about 6% and containing from about one-half to about two pints per gallon of said alcohol.

7. A last slip adapted to form when applied to a last and dried a coating adherent to the last and offering very low resistance to sliding of shoe interiors thereover in removal of shoes from lasts, said last slip consisting essentially of a volatile organic solvent, one part by weight of polydimethyl siloxane rubber gum dissolved in said solvent, from about one to about eight parts by weight of a paste-forming wax, said wax being a glycol ester of montan wax melting above 60° C. and being incompatible with said gum, dispersed in said volatile organic solvent, said polydimethyl siloxane rubber gum having a specific gravity of 0.98 and a Williams plasticity number of from 89 to 114 and said solvent being selected from the group consisting of volatile liquid aromatic hydrocarbons, mineral spirits and chlorinated hydrocarbon solvents for said gum and said wax, from about 50% to about 200% by weight based on the weight of the wax of dimethyl dicetyl ammonium bentonite, and an alcohol having from one to two carbon atoms, the wax being in the form of finely dispersed solvent plasticized particles and the dimethyl dicetyl ammonium bentonite being swelled by the alcohol to a colloidal condition thickening and giving body to the composition to enable application to a last of a film of effective thickness, said last slip having a solids content of from about 5% to about 15%, and a polydimethyl siloxane rubber gum content of from about ½% to about 6% and containing from about one-half to about two pints per gallon of said alcohol.

References Cited in the file of this patent

UNITED STATES PATENTS

| 2,658,004 | Eldridge et al. | Nov. 3, 1953 |
| 2,707,692 | Hecht et al. | May 3, 1955 |

FOREIGN PATENTS

| 9,320 | Great Britain | Apr. 11, 1912 |
| | of 1911 | |